United States Patent
Nayak et al.

(10) Patent No.: US 11,972,091 B2
(45) Date of Patent: Apr. 30, 2024

(54) MULTI-TASKING WORKDESK FOR COMPUTING ENVIRONMENT

(71) Applicant: SAP SE, Walldorf (DE)

(72) Inventors: Jitesh Nayak, Rajnanadgaon (IN); Rajarshi Ghosh, Mannheim (DE); Santhosh Rao, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/321,869

(22) Filed: May 23, 2023

(65) Prior Publication Data

US 2023/0297216 A1    Sep. 21, 2023

Related U.S. Application Data

(63) Continuation of application No. 17/452,692, filed on Oct. 28, 2021, now Pat. No. 11,693,532.

(51) Int. Cl.
*G06F 3/0482* (2013.01)
*G06F 3/04817* (2022.01)

(52) U.S. Cl.
CPC ........ *G06F 3/0482* (2013.01); *G06F 3/04817* (2013.01); *G06F 2203/04803* (2013.01)

(58) Field of Classification Search
CPC ............................ G06F 3/0482; G06F 3/04817
See application file for complete search history.

(56) References Cited

U.S. PATENT DOCUMENTS

| | | | |
|---|---|---|---|
| 7,743,140 B2 | 6/2010 | Arndt et al. | |
| 9,317,195 B1 * | 4/2016 | Grechishkin | ....... G06F 3/04842 |
| 10,409,832 B2 | 9/2019 | Rao et al. | |
| 11,144,174 B1 | 10/2021 | Plesur et al. | |
| 2008/0307017 A1 * | 12/2008 | Lyons | .................. G06F 16/248 |
| 2012/0203766 A1 | 8/2012 | Hornkvist et al. | |
| 2014/0267103 A1 * | 9/2014 | Chaudhri | ............ G06F 3/04817 |
| | | | 345/173 |
| 2014/0365912 A1 | 12/2014 | Shaw et al. | |
| 2015/0205591 A1 * | 7/2015 | Jitkoff | ................. G06F 16/2457 |
| | | | 717/176 |
| 2016/0139776 A1 | 5/2016 | Donahue et al. | |
| 2018/0129396 A1 * | 5/2018 | Buckley | .............. G06F 3/04895 |
| 2019/0087484 A1 | 3/2019 | Jacob et al. | |
| 2021/0110595 A1 | 4/2021 | Nayak et al. | |

(Continued)

OTHER PUBLICATIONS

U.S. Appl. No. 17/324,590, Rao et al., filed May 19, 2021.

(Continued)

*Primary Examiner* — Mong-Shune Chung
(74) *Attorney, Agent, or Firm* — Fish & Richardson P.C.

(57) ABSTRACT

The present disclosure involves system, software, and computer implemented methods for presenting a workdesk comprising three viewports in a graphical user interface (GUI). The first viewport displays an active application, a second viewport displays a toolbar including one or more icons that indicate applications that are available for interactions, and a third viewport displays a toolbar including one or more cross-application tools. Upon receiving a selection of a cross-application tool in the third viewport, an action associated with the selected cross-application tool is performed for at least one of the one or more indicated applications in the second viewport, and results of the action are overlaid in the first viewport.

11 Claims, 6 Drawing Sheets

(56) References Cited

U.S. PATENT DOCUMENTS

2021/0392053 A1* 12/2021 Singh .................. G06F 3/04842
2022/0147228 A1   5/2022 Yi
2023/0137519 A1   5/2023 Nayak et al.

OTHER PUBLICATIONS

U.S. Appl. No. 17/325,697, Rao et al., filed May 20, 2021.
Final Office Action in U.S. Appl. No. 17/452,692, dated Dec. 1, 2022, 15 pages.
Non-Final Office Action in U.S. Appl. No. 17/452,692, dated Aug. 1, 2022, 17 pages.

* cited by examiner

US 11,972,091 B2

MULTI-TASKING WORKDESK FOR COMPUTING ENVIRONMENT

CLAIM OF PRIORITY

This application claims priority under 35 USC § 120 to U.S. patent application Ser. No. 17/452,692, filed on Oct. 28, 2021, titled "MULTI-TASKING WORKDESK FOR COMPUTING ENVIRONMENT"; the entire contents of which are hereby incorporated by reference.

BACKGROUND

In many conventional work platforms, a user must access data or otherwise interact with multiple applications. Often the user will repetitively access the same set of applications, which can be time-consuming, and can result in a poor user experience.

SUMMARY

The present disclosure involves system, software, and computer implemented methods for presenting a workdesk comprising three viewports in a graphical user interface (GUI). The first viewport displays an active application, a second viewport displays a toolbar including one or more icons that indicate applications that are available for interactions, and a third viewport displays a toolbar including one or more cross-application tools. Upon receiving a selection of a cross-application tool in the third viewport, an action associated with the selected cross-application tool is performed for at least one of the one or more indicated applications in the second viewport, and results of the action are overlaid in the first viewport.

Implementations can optionally include one or more of the following features.

In some instances, the selected cross-application tool includes a multi-app search, and the result includes search results associated with performance of the multi-app search. Optionally, the multi-app search searches each of the one or more indicated applications that are available for interactions.

In some instances, the selected cross-application tool includes an object list generator, and the result includes a list of objects currently visible in the active application. Optionally, each object in the list of objects is presented with associated object details that are obtained for each object from at least one of the indicated applications in the second viewport.

In some instances, a selection of two or more icons from the second viewport is received, and in response, the first viewport is dynamically partitioned based on the number of icons that are selected. Optionally, upon receipt of a selection of a first object in a first selected application, a search is performed in a second selected application, the search associated with the first selected object. A presentation of the second selected application can be updated based on the search.

In some instances, performing an action includes transferring information from at least one of the indicated applications to a particular, active application using an application programming interface (API).

The details of these and other aspects and embodiments of the present disclosure are set forth in the accompanying drawings and the description below. Other features, objects, and advantages of the disclosure will be apparent from the description, drawings, and claims.

DETAILED DESCRIPTION

This disclosure describes methods, software, and systems for displaying and interacting with multiple applications in an enterprise computing environment. Many conventional computing environments have a "home page" or "launcher" from which applications are opened or selected. In many instances, users will typically interact with a subset of available applications during routine use. Conventional environments can require the user to return to the "home page" in order to launch or open a new application. For applications or groups of applications that are frequently used in tandem, this can be tedious and time-consuming for the user. This disclosure describes a solution to allow users to rapidly transition between a subset of applications or execute multiple applications from the subset simultaneously, and provides tools for interacting with multiple applications at once. Additionally, the solution can ensure that the subset of applications can share information and applicable objects or context. In one example, this solution can allow pre-filling of forms when the user switches from a logistics application to a records application, based on the context of the logistics application.

The described solution is advantageous in that it provides users with a more efficient method for interacting with their most commonly used applications. This streamlined user experience enables a more efficient workflow, allowing the user to more rapidly acquire the information they require, while reducing the number of windows to traverse and inputs the user must provide. Additionally, by sharing contexts between applications, additional manual actions to move information from application to application can be alleviated.

Figure 1:
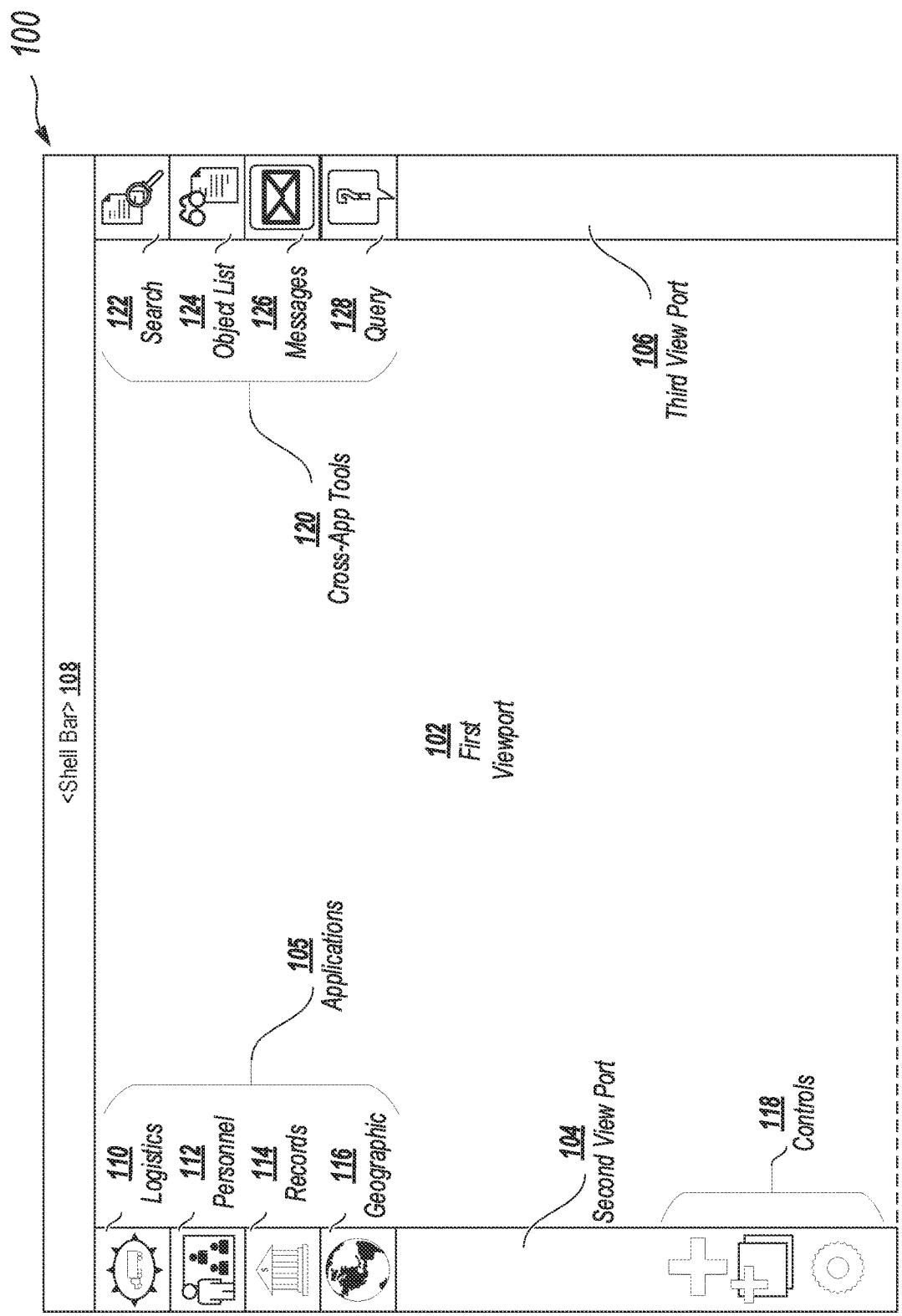
FIG. 1 is an example GUI showing a multi-tasking workdesk.

Turning to the illustrated example implementation, FIG. 1 shows an example graphical user interface (GUI) showing a multi-tasking workdesk 100. The workdesk includes three viewports, a first viewport 102, a second viewport 104, and a third viewport 106. In some implementations, a shell bar 108 is provided along the top of the workdesk 100.

The first viewport 102 is the main page of the workdesk 100, and is used to display currently-executing applications. The first viewport 102 can be divided into multiple partitions to display multiple, simultaneously executing applications, as discussed in further detail below with respect to FIG. 3. In general, the first viewport 102 displays the active application(s) and provides the user with a centralized location to interact with the active application(s).

A shell bar 108 can be provided in the workdesk 100, which can provide basic GUI elements for navigation between other workdesks, or in an out of the enterprise computing system. For example, the shell bar 108 can include a home icon, back button, search bar, notification icon, minimize button, close button, or other elements.

The second view port 104 includes a selected subset of applications 105 that are made available to the user. This subset can be labeled "My Applications" or "Quick Access" and, in the illustrated example, includes a logistics application 110, personnel application 112, records application 114, and a geographic application 116. Each application 105 can be separately installed on the device presenting the workdesk 100. In some implementations, the applications 105 are web-based or cloud-based applications, which are installed and/or execute on a remote server and inputs/commands are passed between the device displaying the workdesk 100 (e.g., laptop, personal computer, mobile phone, tablet, etc.) and the remote server. In some implementations, these web-based or cloud-based applications can be hosted on a similar or the same dataset across a network.

Controls 118 can be provided to allow the user to customize the second view port 104. For example, the controls 118 can allow users to add new applications or remove applications to the applications section 105. Additionally, controls 118 allow the user to re-arrange the applications 105, group the applications 105, or in some implementations, allow the user to generate custom groupings of applications.

While illustrated as a bar on the left hand side of the workdesk 100, the second viewport 104 is not necessarily positioned there. For example, it can be a floating (e.g., user moveable) window, or nested within the shell bar 108, among other possibilities.

The third viewport 106 includes a number of cross-application tools 120. Cross-application tools 120 are tools/applications that interact with each of the applications 105 in the second view port 104. The cross-applications tools 120 allow the user to perform bulk or macro operations, on all of their "quick access" applications in the second viewport 104.

For example, a search tool 122 can allow the user to perform a search (e.g., a natural language search) for particular objects. The search tool 122 can perform a search in the logistics application 110, personnel application 112, records application 114, and geographic application 116, and return any applicable results from each. In some implementations, when activated, the cross-application tools 120 provide an expanded GUI that is overlaid on the first viewport 102 (illustrated in more detail below with respect to FIG. 4.)

In another example, an object list tool 124 can be provided, which can query each of the applications 105 and provide a list of objects the applications 105 are accessing or presenting. This can be useful when a user needs to rapidly access a single object or group of objects that may not be currently displayed in the first viewport 102 (e.g., to copy information, or input a parameter). In some implementations, the object list tool 124 provides a list of objects and associated metadata for each object, where the associated metadata is provided in a contextualized format based on the object type being presented. The object list tool 124 can further include GUI elements to allow the user to filter, sort, search, or otherwise manipulate an object list once it is displayed.

A messages tool 126 can be provided to allow the user to quickly compose messages (e.g., instant messages, emails, SMS messages, etc.) with contextual information readily available from the applications 105. For example, a user can activate the messages tool 126 and begin typing an email to a co-worker. In the body of the email, if the user types in a particular record number, the messages tool 126 can query the records application 114 and autofill data regarding that record number in the email. For example, the workdesk 100 can recognize the record number as an object, and it can automatically retrieve data associated with that object or related objects in order to provide them to the messages tool 126. In another example, if a user receives a message with a particular object attachment in the messages tool 126, they can drag and drop it into the first viewport 102, and the object can populate in the executing application, as well as any other applicable applications 105.

A query tool 128 can allow the user to further investigate or query elements displayed in the first viewport 102. For example, the user can select the query tool 128 and an object of interest in the executing application. The query tool 128 can return a list of related objects associated with the object of interest from other applications in the second view port 104.

The cross-application tools 120 can include additional tools not illustrated in FIG. 1. For example, a History tool can be provided, which shows the user's previous actions, and interactions with applications 105 or the first viewport 102. In another example, a cross-application tool 120 can be a Recommendations tool, which provides recommended actions, or assistance based on one or more machine learning algorithms. The Recommendations tool can recommend inputs, or predict objects that the user may want to access based on previous actions, or common actions amongst multiple users.

While illustrated as a bar on the right hand side of the workdesk 100, the third viewport 106 can be a window or only a partial bar in the workdesk 100. In some implementations, the third viewport 106 can be at the top or bottom of the GUI. The present disclosure is not limited thereto.

Figure 2:
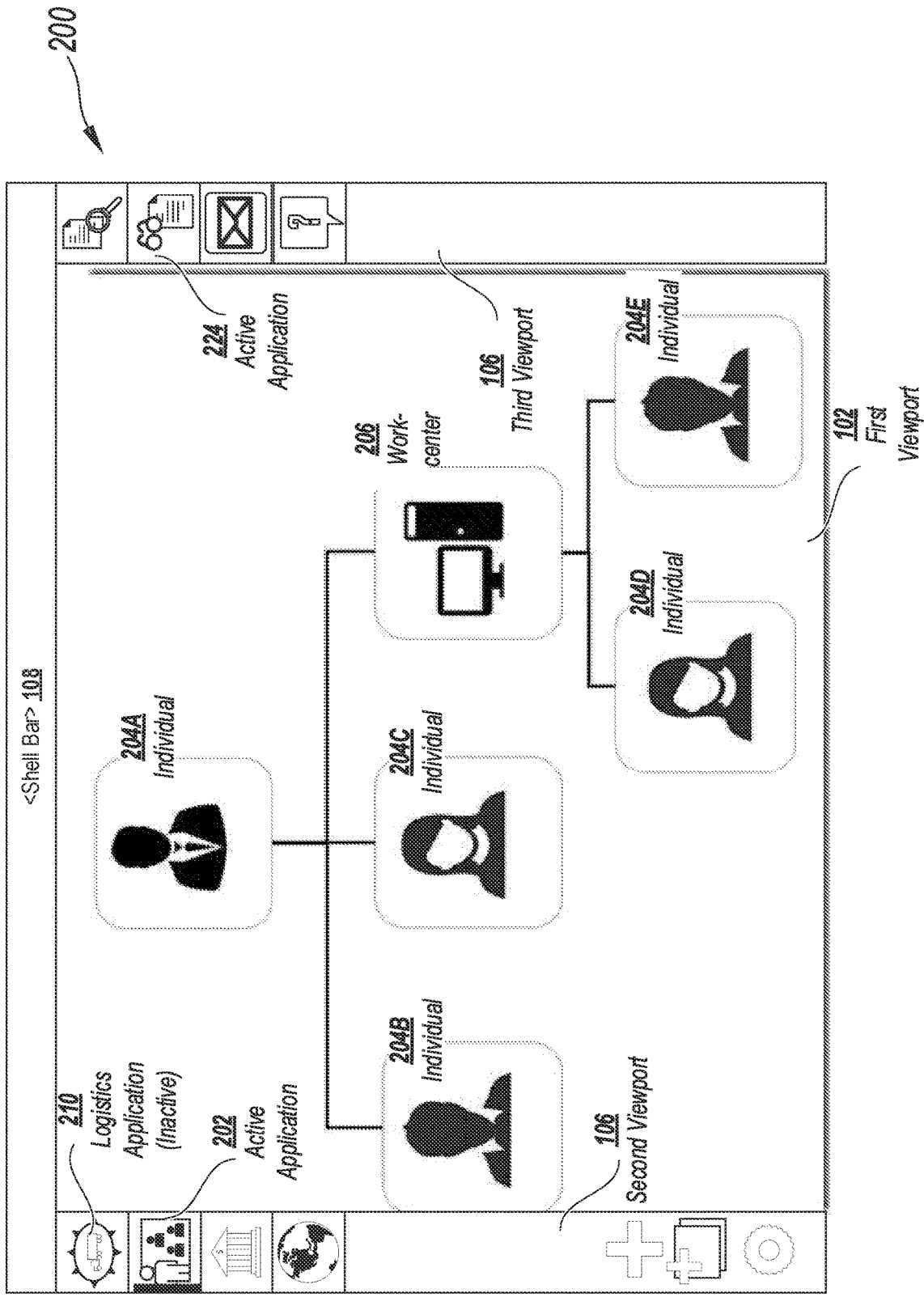
FIG. 2 is an example of a multi-tasking workdesk with an application active.

FIG. 2 is an example of a multi-tasking workdesk with an application active. In the illustrated example, the user has selected the icon for a personnel application (e.g., personnel application 112 of FIG. 1) and the personnel application has become the active application 202. A colored bar, or other emphasis on the icon, can provide an indication to the user that the application is active. The main GUI of the application, and content associated with that application, is then displayed in the first viewport 102.

As the user manipulates, or otherwise interacts with the active application 202, an application context is created. In other words, the active application is put into a particular state, with objects that have been manipulated to a certain context. For example, if the user has selected a particular organization within the personnel application, they can be viewing an organization hierarchy chart that is specific to that organization, with names and data associated with the individuals of that organization. This context can be passed throughout the workdesk 200. For example, if the user selects the objects list tool 224, the tool can populate a list of objects from each of the applications in the second viewport 104 that is filtered to objects associated with the individuals of the selected organization presented in the first viewport 102 (e.g., transportation approvals from logistics application 210 which were approved by individuals 204*a*-*e*).

The workdesk 200 can be a flexible/adjustable GUI based on available screen space. For example, if the workdesk 200 is being presented on a computer screen (e.g., with a landscape aspect ratio) the GUI can present can show all three viewports 102, 104, 106, as illustrated in FIG. 2. In another example, where the workdesk 200 is presented on a mobile device with limited screen space, the second and third viewports (104 and 106) may be hidden or reduced, and presented only in response to a swipe gesture or other input.

Figure 3:
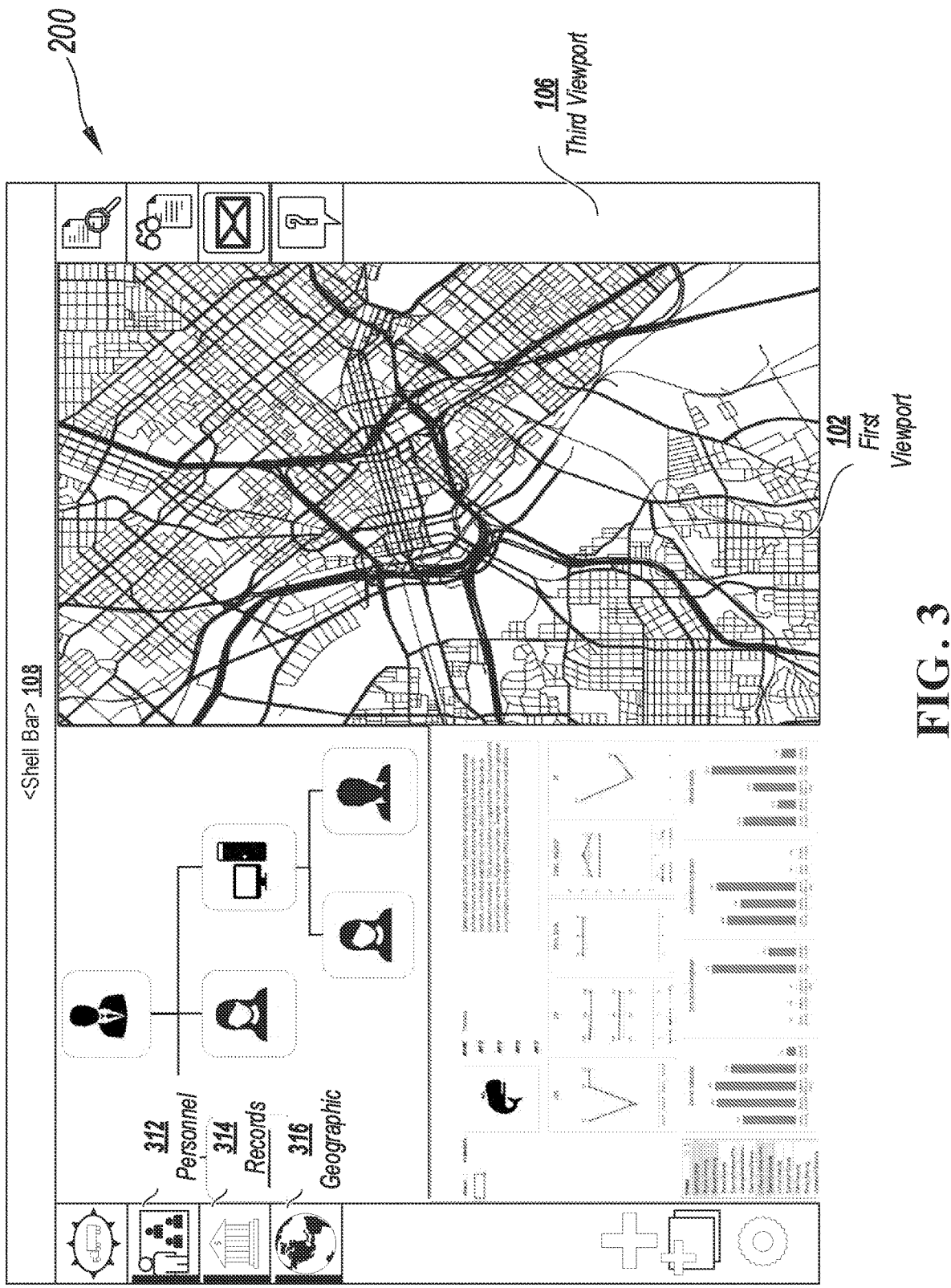
FIG. 3 is an example of a multi-tasking workdesk with multiple active applications.

FIG. 3 is an example of a multi-tasking workdesk with multiple active applications. In the illustrated example, the user has selected three applications to be active, the personnel application 312, records application 314, and geographic application 316. In some implementations, the user can activate multiple applications by selecting them (e.g., ctrl clicking on them or long pressing). In some implementations, when applications are selected, they are defaulted to active until manually deactivated. Upon activation of multiple applications, the first viewport 102 partitions to present the respective GUI's of each active application.

In some implementations, these partitions of the first viewport 102 are adjustable, and the user can slide or move them as desired to provide more or less screen space to each active application. Additionally, in certain instances the GUI's themselves can be moved around or rearranged within the first viewport 102. In the illustrated example, the geographic application 316 has been given the right half of the first viewport 102. In some instances, the first viewport 102 can be partitioned horizontally or diagonally. The partitioning process can be determined based on, among other things, user preferences, previous partitions, application preferences, and available screen space.

As the user manipulates the GUI of a particular application in the first viewport 102, a context can be determined for that particular application and the remaining active applications can update based on the context. For example, if the user selects a particular report from the lower left partition of the first viewport 102, the personnel partition (upper left) and geographic partition (right) can update to show the approver and associated location of the particular report respectively. In some implementations, this is accomplished by triggering, upon selection of an object (e.g., the particular report in one application), a context-based search for that selected object in the remaining active applications. The context for the particular application can be stored in a persistency and maintained throughout the current session. In some instances, the current context may be available in a future session. The context may be stored, and any selections can be maintained for later use, in some implementations. When retrieving the context, previous selections can be re-selected, and a current version of the information can be presented using the stored context. In some instances, the selected context can be shared across users, or between platforms. Results of that search are then used to filter or modify what is displayed in the remaining active applications' respective GUI's.

Figure 4:
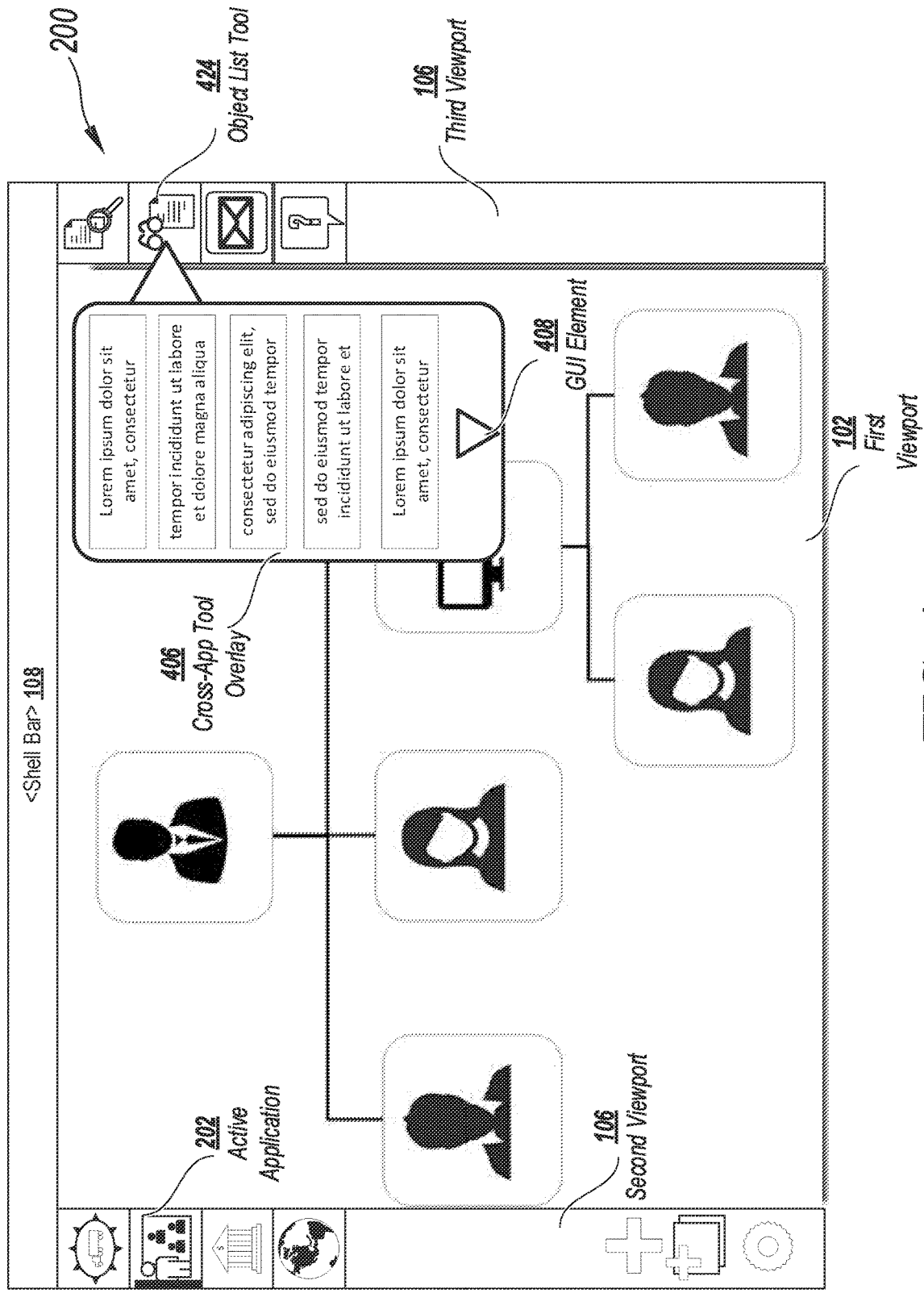
FIG. 4 is an example of a cross-application tool result displayed in a multi-tasking workdesk.

FIG. 4 is an example of a cross-application tool result displayed in a multi-tasking workdesk. In the illustrated example, the object list tool 424 was used to provide a list of objects associated with the active application 202, as well as the three remaining inactive applications.

The cross-application tool overlay 406 is displayed over the first viewport 102 and can include one or more GUI elements 408 for manipulating the cross-application tool. In the illustrated example, the GUI element 408 is an arrow to allow for scroll operations within the overlay 406. In some implementations, GUI elements 408 includes search bars, scroll elements, toggles, buttons, or other elements for providing inputs and manipulating the cross-application tools in the third viewport 106.

While the illustrated example shows an overlay 406 presented over the first viewport 102, in some implementations, the cross-application tools provide navigation to different applications, or merely highlight elements in the first viewport 102. The present disclosure is not limited thereto.

Figure 5:
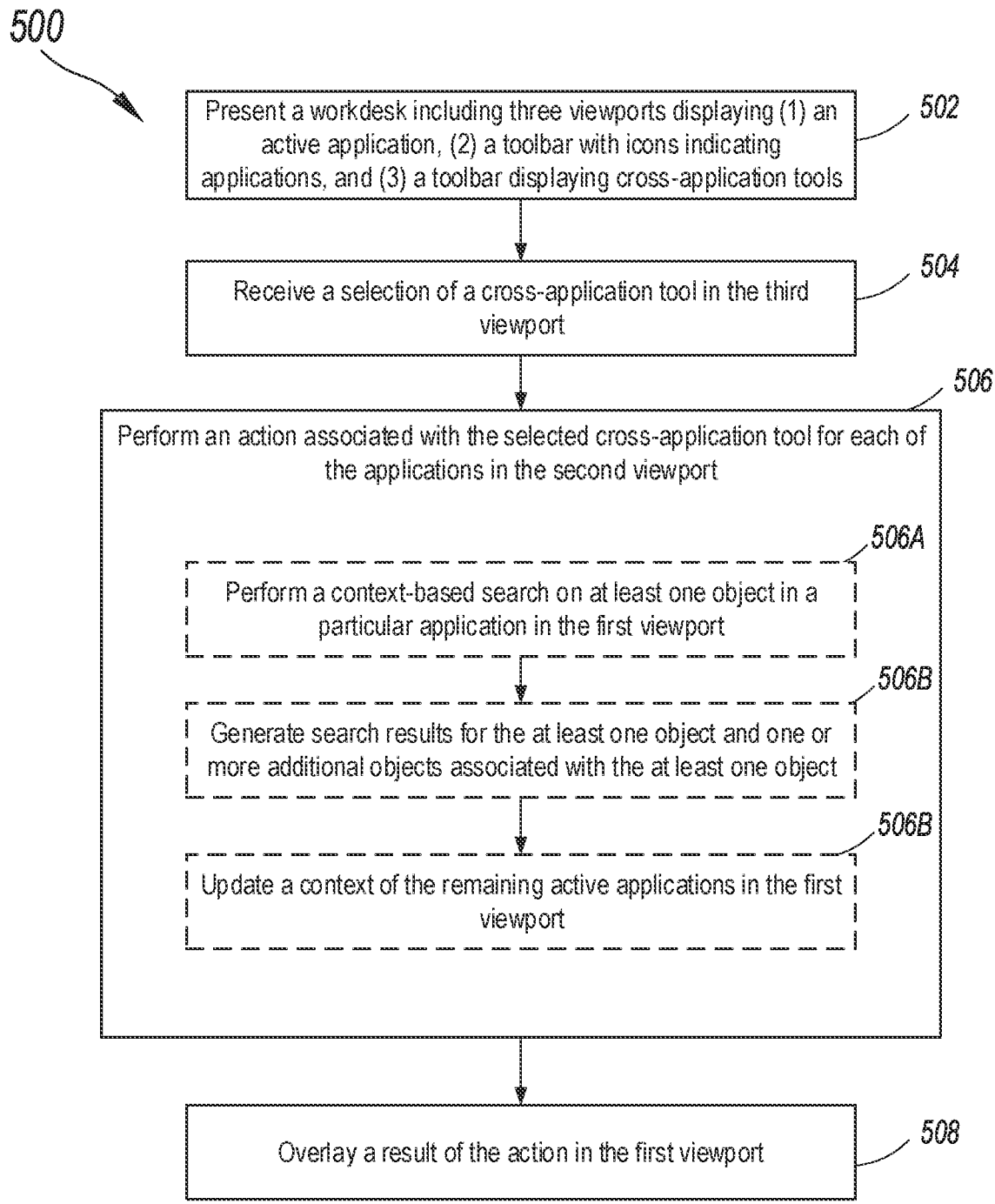
FIG. 5 depicts an example process 500 that can be executed in accordance with implementations of the present disclosure

FIG. 5 depicts an example process 500 that can be executed in accordance with implementations of the present disclosure. In some implementations, the example process 500 may be performed using one or more computer-executable programs executed using one or more computing devices.

At 502, a workdesk is presented that includes three viewports. A first viewport displays an active application, a second viewport displays a toolbar with icons indicating applications that are available for interaction, and a third viewport displays cross-application tools. The viewports can be arranged similar to the examples illustrated in FIGS. 1-4. In some implementations, additional elements are displayed on the workdesk (e.g., a shell bar, fourth viewport, etc.).

At 504, a selection of a cross-application tool is received in the third viewport. Cross-application tools are tools that interact with one or more of the applications displayed in the second viewport. Cross-application tools can include, but are not limited to, a search tool, an object list tool, a messaging tool, a query tool, a history tool, or an assistant tool.

At 506, an action associated with the selected cross-application tool is performed for each of the applications in the second viewport. The action is associated with execution of the cross-application tool. Optionally at 506A, a context-based search of at least one object in an active application from the first viewport is performed. The context-based search can be a search for a specific object selected in the first viewport, or for a group of objects that are generally active in the first viewport, among other things. At 506B, search results based on the context-based search are generated for the at least one object, and one or more additional objects associated with the at least one object. At 506C, a context of any remaining applications in the first viewport that are active is updated based on the search results. The updated context can include selecting, emphasizing or otherwise displaying objects in the remaining applications that are associated with the search results. In some implementations the remaining active applications are filtered according to the search results, displaying only related objects, or if no related objects are found, nothing, or a default screen.

At 508, results from the action associated with the selected cross-application tool are presented as an overlay in the first viewport. For example, if a search tool is selected, a results list can be overlaid displaying search results from each of the available applications in the second viewport.

Figure 6:
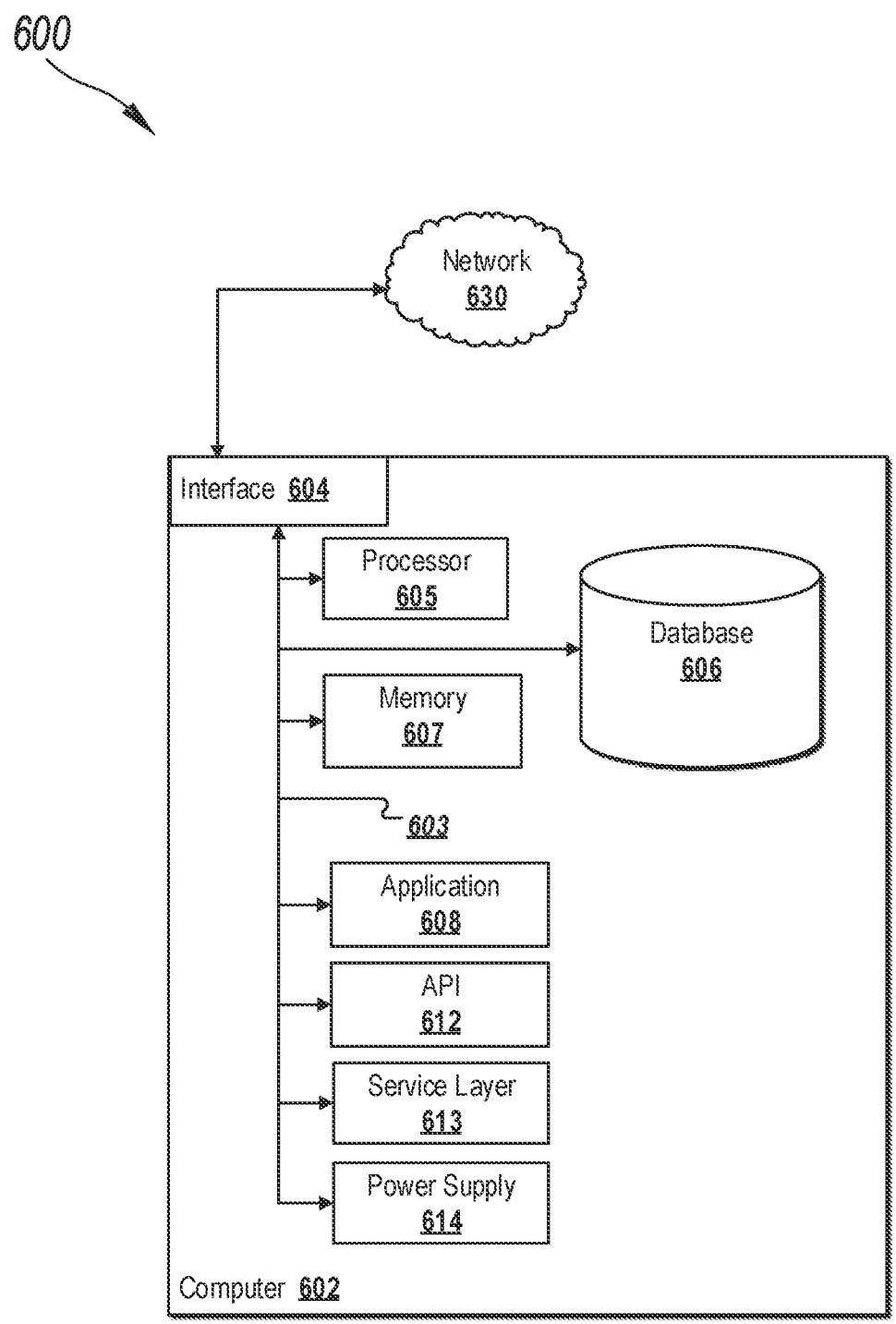
FIG. 6 is block diagram illustrating an example of a computing-implemented system.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, system 600 includes a computer 602 and a network 630.

The illustrated computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 602 can include an input device, such as a keypad, keyboard, or touch screen, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a distributed computing system as, for example, a client, network component, a server, or a database or another persistency, or a combination of roles for performing the subject matter described in the present disclosure. The illustrated computer 602 is communicably coupled with a network 630. In some implementations, one or more components of the computer 602 can be configured to operate within an environment, or a combination of environments, including cloud-computing, local, or global.

At a high level, the computer 602 is an electronic computing device operable to receive, transmit, process, store, or manage data and information associated with the described subject matter. According to some implementations, the computer 602 can also include or be communicably coupled with a server, such as an application server, e-mail server, web server, caching server, or streaming data server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using the service layer 613. Software services, such as those provided by the service layer 613, provide reusable, defined functionalities through a defined interface. For example, the interface can be software written in a computing language (for example, JAVA or C++) or a combination of computing languages, and providing data in a particular format (for example, extensible markup language (XML)) or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and includes logic encoded in software, hardware, or a combination of software and hardware. More specifically, the interface 604 can include software supporting one or more communication protocols associated with communications such that the network 630 or hardware of interface 604 is operable to communicate physical signals within and outside of the illustrated computer 602.

The computer 602 includes a processor 605. Although illustrated as a single processor 605, two or more processors 605 can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory or conventional database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. The database 606 can hold any data type necessary for the described solution.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

The preceding figures and accompanying description illustrate example processes and computer-implementable techniques. However, the workdesk 100 (its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or perform additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for interacting with multiple applications, the method comprising:
    presenting, in a graphical user interface (GUI), a workdesk comprising three viewports, wherein a first viewport displays an active application, a second viewport displays a toolbar comprising one or more icons indicating applications that are available for interactions by one or more cross-application tools, and a third viewport displays a toolbar comprising the one or more cross-application tools;
    receiving a selection of a cross-application tool in the third viewport;
    performing an action associated with the selected cross-application tool within at least one of the one or more indicated applications;
    overlaying a result of the action in the first viewport;
    receiving a selection of two or more icons from the second viewport;
    in response to receiving the selection of two or more icons in the second viewport, displaying each selected application in the first viewport, wherein the first viewport is dynamically partitioned based on the number of icons that are selected;
    receiving a selection of a first object in a first selected application;
    performing a search associated with the first object in a second selected application based on the selection of the first object in the first selected application; and
    updating a presentation of the second selected application based on the search.

2. The method of claim 1, wherein the selected cross-application tool comprises a multi-app search, and wherein the result comprises search results associated with performing the multi-app search.

3. The method of claim 2, wherein the multi-app search searches each of the one or more indicated applications that are available for interactions.

4. The method of claim 1, wherein performing an action comprises transferring information from at least one of the indicated applications to a particular, active application using an application programming interface.

5. A non-transitory computer-readable storage medium coupled to one or more processors and having instructions stored thereon which, when executed by the one or more processors, cause the one or more processors to perform operations for traversing associative software objects, the operations comprising:
    presenting, in a graphical user interface (GUI), a workdesk comprising three viewports, wherein a first viewport displays an active application, a second viewport displays a toolbar comprising one or more icons indicating applications that are available for interactions by one or more cross-application tools, and a third viewport displays a toolbar comprising the one or more cross-application tools;
    receiving a selection of a cross-application tool in the third viewport;
    performing an action associated with the selected cross-application tool within at least one of the one or more indicated applications;
    overlaying a result of the action in the first viewport;
    receiving a selection of two or more icons from the second viewport;
    in response to receiving the selection of two or more icons in the second viewport, displaying each selected application in the first viewport, wherein the first viewport is dynamically partitioned based on the number of icons that are selected;
    receiving a selection of a first object in a first selected application;
    performing a search associated with the first object in a second selected application based on the selection of the first object in the first selected application; and
    updating a presentation of the second selected application based on the search.

6. The non-transitory medium of claim 5, wherein the selected cross-application tool comprises a multi-app search, and wherein the result comprises search results associated with performing the multi-app search.

7. The non-transitory medium of claim 6, wherein the multi-app search searches each of the one or more indicated applications that are available for interactions.

8. The non-transitory medium of claim 5, wherein performing an action comprises transferring information from at least one of the indicated applications to a particular, active application using an application programming interface.

9. A system, comprising:
one or more computers; and
a non-transitory computer-readable storage device coupled to the one or more computers and having instructions stored thereon which, when executed by the one or more computer, cause the one or more computers to perform operations for traversing associative software objects, the operations comprising:
presenting, in a graphical user interface (GUI), a workdesk comprising three viewports, wherein a first viewport displays an active application, a second viewport displays a toolbar comprising one or more icons indicating applications that are available for interactions by one or more cross-application tools, and a third viewport displays a toolbar comprising the one or more cross-application tools;
receiving a selection of a cross-application tool in the third viewport;
performing an action associated with the selected cross-application tool within at least one of the one or more indicated applications;
overlaying a result of the action in the first viewport;
receiving a selection of two or more icons from the second viewport;
in response to receiving the selection of two or more icons in the second viewport, displaying each selected application in the first viewport, wherein the first viewport is dynamically partitioned based on the number of icons that are selected;
receiving a selection of a first object in a first selected application;
performing a search associated with the first object in a second selected application based on the selection of the first object in the first selected application; and
updating a presentation of the second selected application based on the search.

10. The system of claim 9, wherein the selected cross-application tool comprises a multi-app search, and wherein the result comprises search results associated with performing the multi-app search.

11. The system of claim 10, wherein the multi-app search searches each of the one or more indicated applications that are available for interactions.

* * * * *